United States Patent [19]

Parker

[11] Patent Number: 5,053,659

[45] Date of Patent: Oct. 1, 1991

[54] CENTRIFUGAL FORCE MAGNETIC FIELD VARIATOR

[76] Inventor: Denson Parker, 2072 Center Blvd., Springfield, Ohio 45506

[21] Appl. No.: 593,879

[22] Filed: Oct. 5, 1990

[51] Int. Cl.$^5$ .................. H02K 11/00; H02K 1/34; H02K 21/22; H02K 23/54

[52] U.S. Cl. .................. 310/68 E; 310/68 B; 310/69; 310/152; 310/191

[58] Field of Search .................. 310/46, 68 B, 68 D, 310/68 E, 69, 80, 83, 103, 152, 273, 322, 181, 191, 199; 290/53, 54, 55, 36 A, 38 B, 52, 47

[56] References Cited

U.S. PATENT DOCUMENTS

| | | | |
|---|---|---|---|
| 3,573,517 | 4/1971 | Osterstorm | 310/103 |
| 3,587,015 | 6/1971 | Mitchel | 335/227 |
| 3,792,295 | 2/1974 | Garbi | 310/46 |
| 3,992,132 | 11/1976 | Putt | 417/271 |
| 4,167,684 | 9/1979 | Kelly | 310/80 |
| 4,191,902 | 3/1980 | Yarrow | 310/68 D |
| 4,289,988 | 9/1981 | Schaefer | 301/68 E |
| 4,486,675 | 12/1984 | Albert | 310/46 |
| 4,526,007 | 7/1985 | Smith | 60/698 |
| 4,613,779 | 9/1986 | Meyer | 310/112 |
| 4,752,706 | 6/1988 | Meszaros | 310/80 |
| 4,782,256 | 11/1988 | Kokubu | 310/83 |

Primary Examiner—Steven L. Stephan
Assistant Examiner—Dennis R. Haszko
Attorney, Agent, or Firm—Anthony D. Cennamo

[57] ABSTRACT

A magnetic actuator for controlling the electrical induction in a pickup coil to a predetermined speed of rotation of a workpiece actuated shaft consisting of a series of magnets in a fixed circular relationship to a rotating shaft and a complimentary series of magnets positioned on the first series and magnetically retained thereon, a series pickup coil also circularly posiitoned relative to the rotating shaft but of a greater diameter than the ring formed by the magnets, and upon the rotation of the shaft workpiece, the magnets with continue to the attracted; as the rotation increases the centrifugal force of rotation increases and as the speed of rotation attains a given speed, the centrifugal force exceeds the magnetic attraction between the two series of magnets; at this speed the second series of magnets will move outwardly from the rotating shaft; the mgneticfield of the moved magnets become vertically aligned with the series pickup coil and wherein the magneticfield induces an electrical potential in the series picup coil. Several coil configurations and alternative magnet configurations are possible.

10 Claims, 3 Drawing Sheets

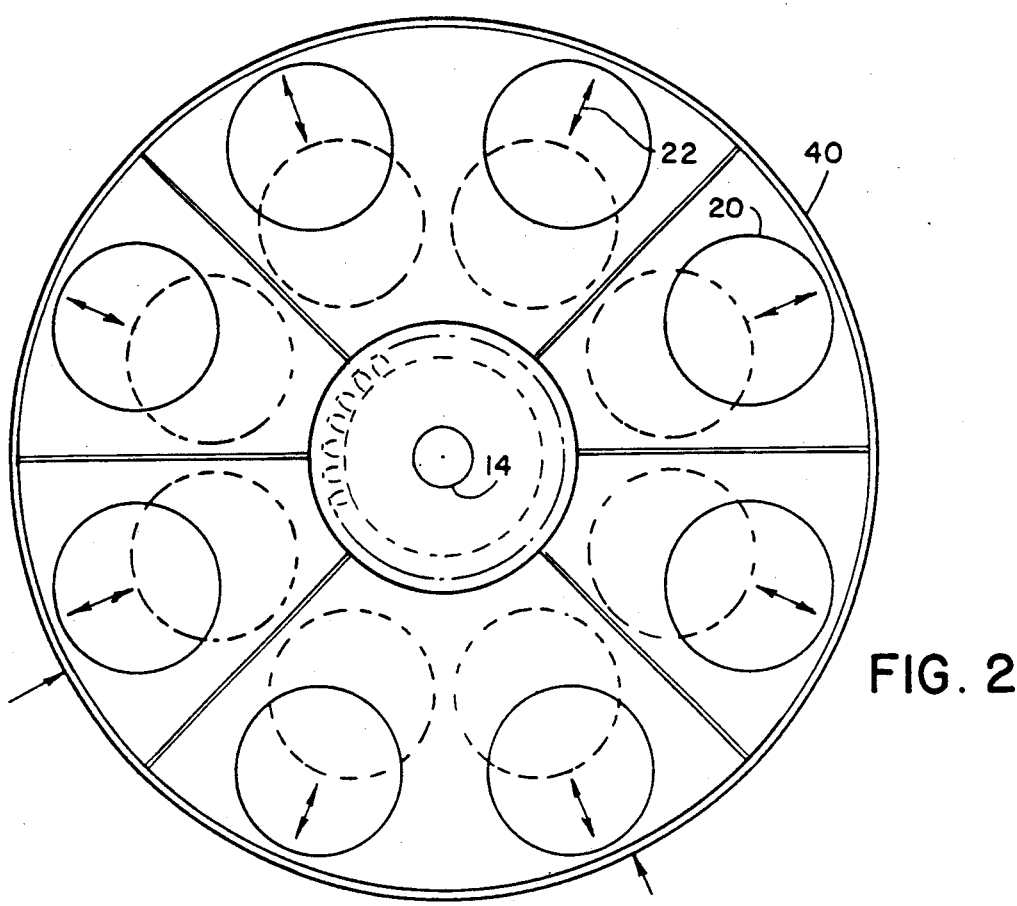
FIG. 2
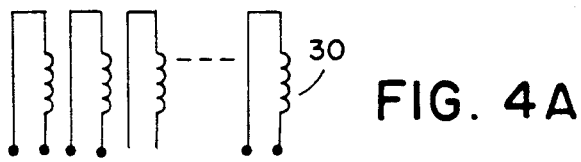
FIG. 4A
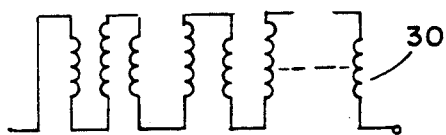
FIG. 4B
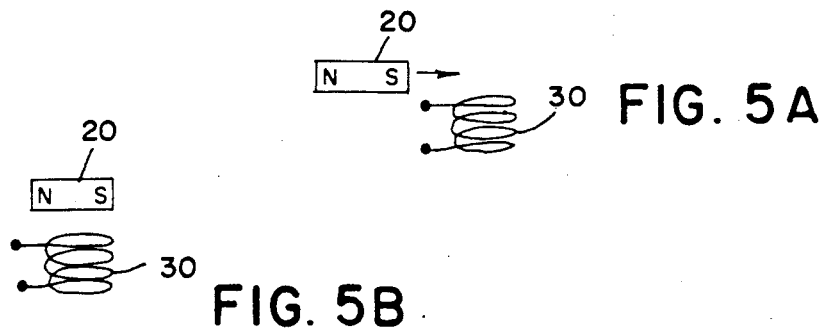
FIG. 5A
FIG. 5B 5,053,659

CENTRIFUGAL FORCE MAGNETIC FIELD VARIATOR

BACKGROUND OF THE INVENTION

1. Field of the Invention

The invention relates to an improved centrifugal force to magnetic field variator, converter brake, and method for its manufacture, and more particularly the invention is directed to a series of magnets positioned on a rotational disc having a plurality of pickup coils positioned on the periphery of the disc, the opposing fields of the magnets causing the magnets to center themselves and upon rotation of the magnets, a sufficient rotational centrifugal force must be generated to cause the magnets to overcome the attractive force of the opposing fields; hence the greater the speed of rotation, the further out the magnets may move from the center, and electrical pickup coils positioned at an outermost periphery have induced therein an electrical potential by the moving electrical field and again the greater the speed then the greater the relative closeness of the position of the magnets and the electrical pickup windings.

Wind, wave or other motion convertors or such actuated electrical generators are well known in the art and have been used to generate electricity solely from wind or other power. Unfortunately the cost of the apparatus when equated to the electrical power generated far exceeds the normal cost of any amount of electrical power. The required sophistication of the apparatus is a primary cost factor, more specifically the wind force is not readily calculated and there may at times be no wind or waves, or there may be winds or waves at gale forces. As a practical matter then, the generator must be capable to respond to velocities of almost no miles per hour to velocities of fifty or more miles per hour, a neat feat. The expedient mostly used is to utilize brakes of one form or another to dampen the speed of rotation when the wind velocity exceeds a given range; particularly an apparatus arranged to permit operation of a wind generator at very low velocities is very sophisticated and subject to damage at high wind velocities. Accordingly, the high velocity winds are being sacrificed for the low velocity winds in complete contradistinction to the economy of the apparatus, and, to a point of the system, the greater the velocity the greater the amount of electrical power generated.

2. Description of the Prior Art

Various prior brake or impedance energy conversion applicator devices and magnetic actuators for controlling the electrical induction in pickup coils, and the like, as well as apparatus and method of their construction in general, are found to be known, and exemplary of the prior art are the following:

U.S. Pat. No. 3,992,132 J. William Putt

The patent or known prior uses teach and disclose various types of energy conversion devices of sorts and of various manufactures and the like as well as methods of their construction, but none of them whether taken singly or in combination disclose the specific details of the combination of the invention in such a way as to bear upon the claims of the present invention.

SUMMARY OF THE INVENTION

An object, advantage and feature of the invention is to provide an apparatus utilizing magnetic attraction forces equated to a centrifugal force to control the operation of a wind responsive electrical power generator; a principle of its operation is a sacrifice of power but a sacrifice at the low velocity winds of inefficient electrical power generation rather than at the high efficiency high velocity winds.

Another object of the invention is directed further to a device providing for a first and second series of permanent magnets rotationally positioned in a ring about the rotating shaft; the first series of magnets are magnetically attracted to the fixedly positioned second series of magnets; a series pickup coil is non-rotationally positioned in a ring relative to the rotating shaft, but however with an initial diameter greater than that of the pair of series of magnets.

Also an object of the invention is to provide apparatus which in operation performs wherein the speed of rotation of the shaft increases, the centrifugal force exerted upon the non-fixed magnets proportionally increases. As the centrifugal force exceeds the magnetic attraction force, the second series of magnets will move outwardly to a position directly above the ring pickup coil; at this position the magnetic field emanating from the ring of magnets will traverse the ring of pickup coils and thereby induce an electrical potential therein.

Another object of the invention is to provide a novel and improved method of selectively providing magnetic parameters and the weight of the magnets are so controlled to permit movement of the magnets at a predetermined speed of rotation of the rotating shaft.

It is a principle object of the present invention to provide apparatus and means for controlling the utilization of a rotation shaft to a determined speed of rotation, wherein the force of the rotating shaft is utilized above a predetermined speed and sacrificed below a predetermined speed, wherein the magnetic force of a pair of attracted permanent magnets are equated against the centrifugal force of the rotating shaft, and wherein the electrical power generated by the rotating shaft is utilized at higher speeds of rotation.

These together with other objects and advantages which will become subsequently apparent reside in the details of the process and operation thereof as more fully hereinafter are described and claimed, reference being had to the accompanying drawings forming a part hereof, wherein like numerals refer to like parts throughout.

DESCRIPTION OF THE SEVERAL VIEWS OF THE DRAWINGS

FIG. 2 is an enlarged top view of the magnets shown in FIG. 1 and embodying the concepts of the invention;

FIG. 4A illustrates basically a schematic circuitry of a series of pickup coils; and FIG. 4B is a showing of a plurality of coils connected in series; and FIG. 5A is a partial side view of a permanent magnet and its magnet in a field relative to the pickup coil when the speed of rotation of the shaft is below a given level; and FIG. 5B is wherein the speed of rotation of the shaft when exceeding a given level.

DESCRIPTION OF A PREFERRED EMBODIMENT OF THE INVENTION

Figure 1:
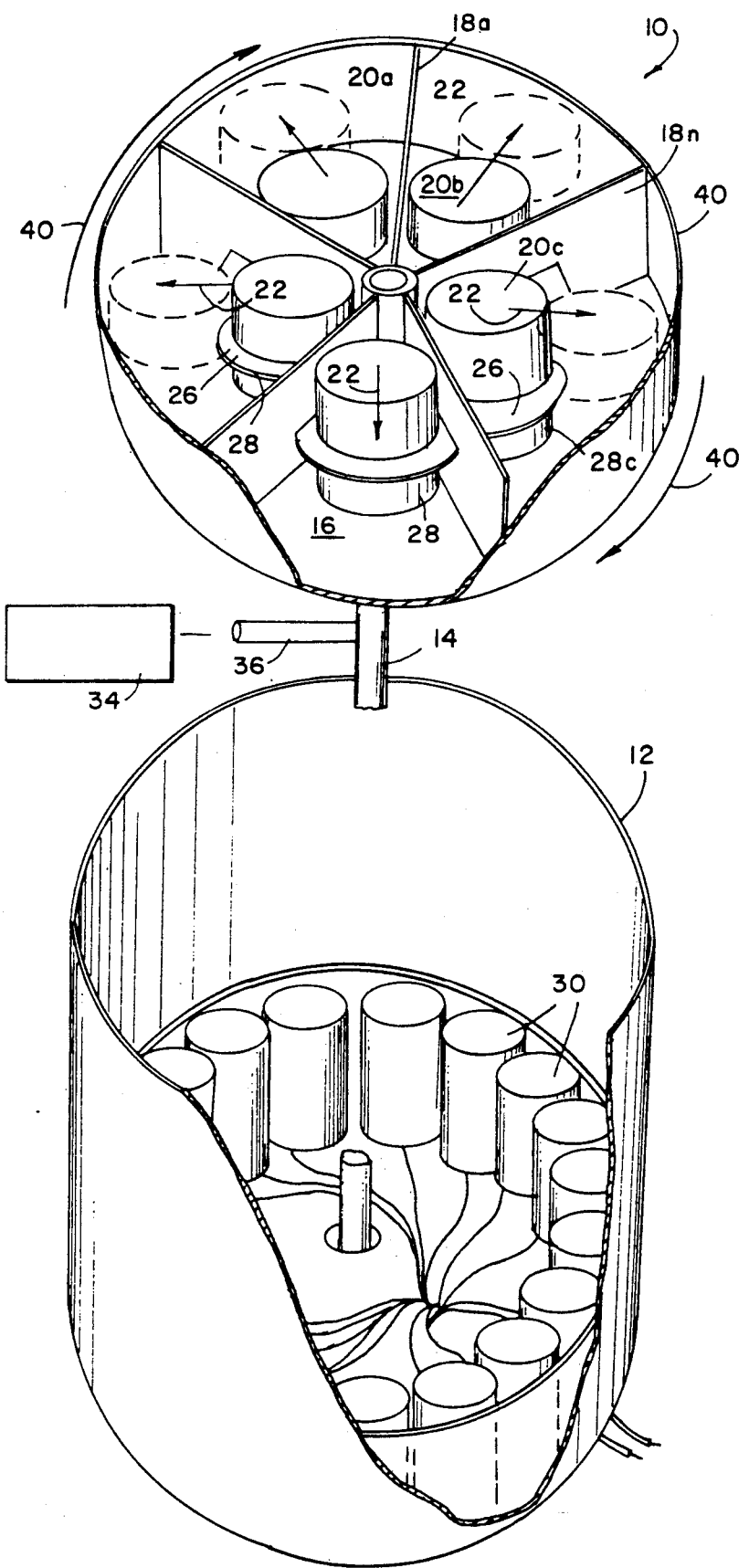
FIG. 1 is a pictorial and perspective view showing the energy conversion system and illustrating a typical installation thereof according to a preferred embodiment and best mode of the present invention.
Figure 3A:
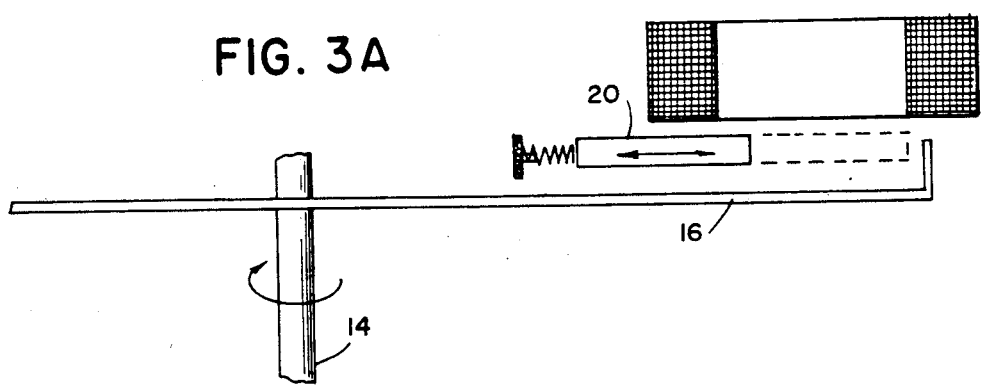
FIGS. 3A, 3B, and 3C are side views of various arrangements of magnets shown in FIGS. 1 and 2.
Figure 3B:
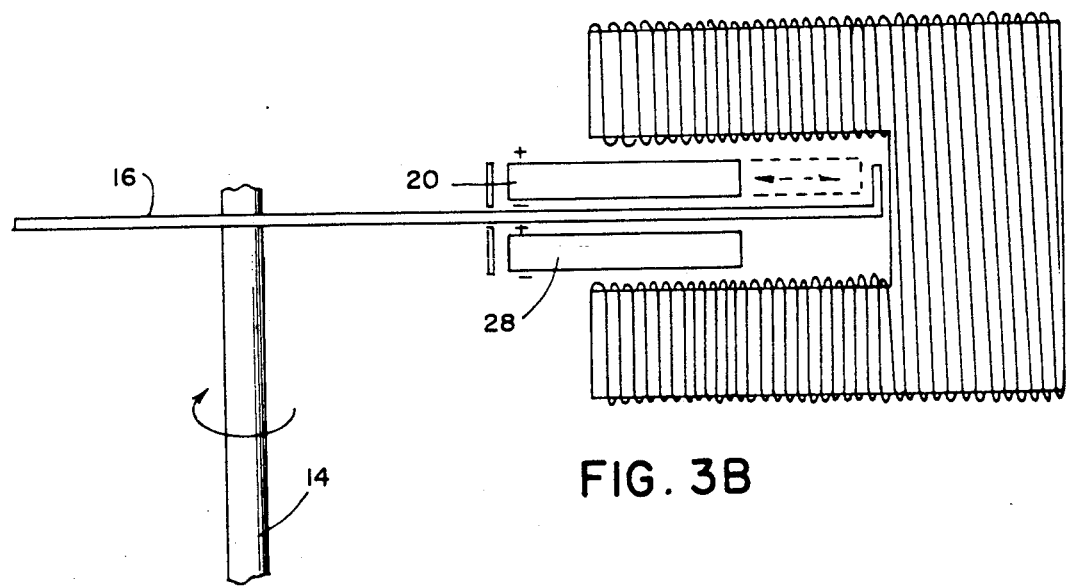
Figure 3C:
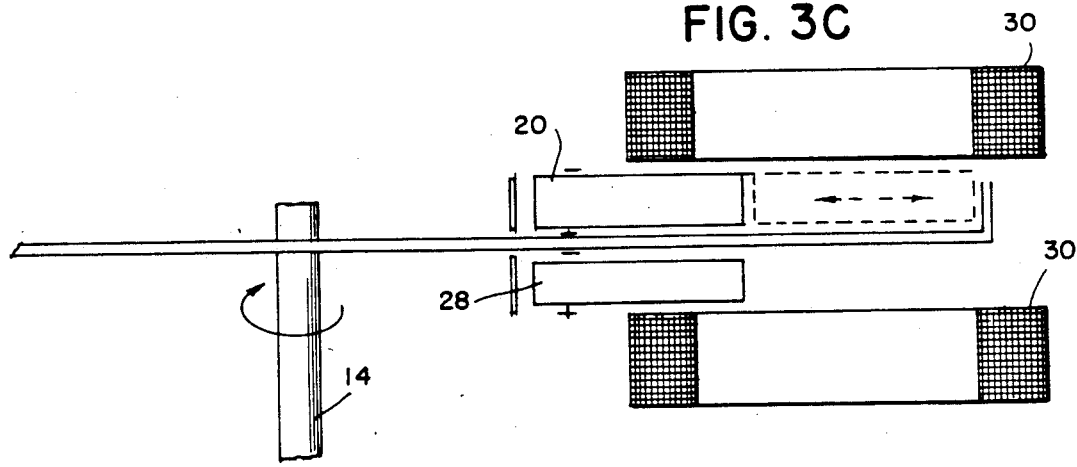

Referring now to the drawings there is shown in FIG. 1 an energy conversion system 10 including a housing 12, a vertical shaft 14 for rotation therein on which is mounted a base platform 16 supportably arranged perpendicular to the vertical shaft 14 with a series of partitions or bulkheads 18a to 18n, sometimes referred as 18a–n or simply as bulkheads 18, affixedly secured to the shaft 14 and base platform 16. A first series of magnets 20a–n are disposed to slide outwardly as shown by arrows 22 along a plane surface 26 under which are a series of magnets 28a–n, these series of magnets 20,28 being of a commercial grade of magnetic material in which the size, strength, number and configuration of the magnets is chosen relative to the centrifugal force and the utilization to be applied. The base platform 16 has positioned thereon in a fixed manner the second series of magnets 28a–n by mechanical or adhesive means and the first series of magnets 20a–n are placed directly above and on the second series of magnets in a one-to-one manner. The opposing attractive forces of the two magnets 20, 28 cause the second series of magnets 28 to adhere to the first series of magnets 20. The base platform 16 is compartmented by bulkheads 18a–n provided to maintain the two series of magnets in aligned and in position. Positioned below the first and second series of magnets 20, 28 and beneath the base platform 16 are pickup coils 30 connected in parallel in FIG. 4A and connected in series in FIG. 4B and each so arranged in a ring configuration around the shaft 14. The primary distinction in the ring coil 30 with that of the magnets 20, 28 is that the diameter of the ring coil 30 is greater than the magnets 20, 28. The interaction between a magnetic field traversing the electrical pickup coil 30 causes an electrical potential to be induced in the pickup coil 30, a fundamental concept identified in Maxwell/Faraday induction theory as the first law of electromagnetic attraction and such concept is applied in this preferred embodiment.

In operation upon rotation of the shaft 14 by the motive workpiece 34 and couple 36 by wind or water power (not shown) so the first and second series of magnets 20, 28 will rotate as shown by the arrow 40 within the housing 12; in turn the magnetic field of the magnets will be equally in rotational motion.

If the series pickup coils 30 fixedly positioned and non-rotational were directly below the magnets 20, 28 the magnetic fields of the rotating magnets would induce a voltage in the pickup coils 30. Such an arrangement would be a simplified electrical power generator operable from the rotating shaft 14.

As a practical matter, primarily from the mechanical and structural standpoint, there would be encountered problems if such an arrangement would be utilized with the rotating shaft 14 varying in speed of rotation from one extreme to the other.

The greater the speed of rotation, the greater the velocity of the magnetic field traversing the pickup coils and the greater the induced electrical potential therein. To obviate the attendant problems, as aforesaid, but yet benefit from the speed rotation of the shaft and workpiece 34 for the utilization of the higher induced potentials, the preferred embodiment restricts the slow speed of the shaft 14 from inducing an electrical potential without limiting the high speeds.

The first series of magnets 20 magnetically attract the second series of magnets 28, the attraction being sufficient force to prevent the magnetic field thereof to traverse the pickup coils 30 positioned therebelow. That is, the plurality of the series pickup coils 30 are circularly positioned about the shaft 14, much in the same manner as the pair of series of magnets 20, 28 The distinction being that the pickup coils 30 has a diameter greater than that of the magnets 20, 28. The diameter of the rings of the pickup coils 30 is beyond the rings of the magnetic field of the magnets 20, 28 when the magnets 20, 28 are in a stationary position as shown by the said circular line of the magnets in FIG. 2. The diameter is chosen to be directly below the magnetic field when the magnets 20 are in their extended position as shown by the dotted by the dotted lines of FIG. 2.

As the shaft 14 rotates the entire magnet assembly is rotationally joined to the shaft 14 will similarly rotate. Centrifugal force will be exerted opn the magnets 20, 28 and will urge the magnets 20 outwardly. The magnets 28 are fixed to the platform 16 and hence will not move outwardly and the first series of magnets 20 being magnetically attracted to the second series of magnets 28 will also not move outwardly.

With an increase in the speed of rotation of the shaft 14, the centrifugal force applied will increase proportionally and subsequently with continued to increase in speed of the shaft 14, the centrifugal force will overcome the magnetic attraction between the two series of magnets 20, 28. When this occurs, the first series of magnets 20 will no longer be restrained from movement by the second series of magnets 28.

In addition to the two series of magnets 20, 28 being comparted by the bulkheads 18a–n, there is also formed with the platform 16 a barrier wall 40. The range of travel of the first series of magnets 20 is limited from an inwardly position upon being stationary on a slow rotation of the shaft 14 to a position adjacent the barrier wall 40 upon a high speed rotation.

The apparatus of the energy conversion system 10 of the invention may be so constructed and arranged in its component parts that it may be assembled as a kit or in kit form.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Letters Patent is:

1. Apparatus for the utilization of an electrical potential induced by a magnetic field subjected to centrifugal forces comprising a platform fixedly positioned to a rotating workpiece affixed to a supporting rotating shaft, a first series of magnets having a magnetic field slidably arranged on the platform at an inner diameter adjacent the rotating shaft, a second series of magnets having a magnetic field positioned on the first series of magnets and magnetically retained thereon, a barrier for limiting an outward movement of the first and second series of magnets secured to the platform and having a diameter greater than the diameter of each of the first and second series of magnets, pickup coil means fixedly positioned beneath the platform and having a diameter greater than the diameter of the first and second series of magnets but less than the diameter of the barrier, the first series of magnets being forced outwardly to a position impacting the barrier in response to centrifugal force of the rotating workpiece exceeding the force of the magnetic field of attraction between the first and second series of magnets, and the first series of magnets being extended to the magnetic fields thereof to attain a vertical alignment with the pickup coil means thereby inducing therein the electrical potential.

2. The apparatus of claim 1 wherein the apparatus is in a housing.

3. The apparatus of claim 1 wherein the magnets of the first and second series are greater in number than said pickup coils.

4. The apparatus of claim 1 wherein the housing cylindrical.

5. The apparatus of claim 1 wherein the series of magnets and pickup coils are cylindrically arranged and the first series of magnets are retained by a spring to a first position adjacent the shaft.

6. The apparatus of claim 1 wherein the coils are connected in series.

7. The apparatus of claim 1 wherein the coils are connected in parallel.

8. The apparatus of claim 1 wherein the the barrier wall is cylindrical.

9. The apparatus of claim 1 wherein the shaft is vertically disposed.

10. The apparatus of claim 1 wherein the series of magnets are separated by a bulkhead.

* * * * *